United States Patent
Ilgen

[11] Patent Number: 5,674,245
[45] Date of Patent: Oct. 7, 1997

[54] DEVICE FOR THE REPAIR OF HOOF CRACKS

[76] Inventor: Kurt Ilgen, 370 Huntington, Sheridan, Wyo. 82801

[21] Appl. No.: 748,710

[22] Filed: Nov. 13, 1996

Related U.S. Application Data

[63] Continuation of Ser. No. 392,424, Feb. 22, 1995, abandoned.

[51] Int. Cl.$^6$ ............................... A61B 17/08
[52] U.S. Cl. ................................................ 606/212
[58] Field of Search ........................ 606/212, 219, 606/220, 221; 411/457

[56] References Cited

U.S. PATENT DOCUMENTS

| | | | |
|---|---|---|---|
| 268,632 | 12/1882 | Danforth | 606/220 |
| 309,690 | 12/1884 | Carroll . | |
| 380,093 | 3/1888 | Cruice et al. | 606/212 |
| 381,868 | 4/1888 | Wiestner . | |
| 408,080 | 7/1889 | Carroll | 606/212 |
| 652,796 | 7/1900 | Mackey . | |
| 1,163,617 | 12/1915 | Dresser . | |
| 1,412,582 | 4/1922 | Vaile | 411/457 |
| 1,478,932 | 12/1923 | Wetz et al. | 411/457 |
| 1,480,746 | 1/1924 | De Bie | 411/457 |
| 3,915,170 | 10/1975 | Nyssen . | |
| 4,454,875 | 6/1984 | Pratt et al. | 606/219 |
| 4,635,637 | 1/1987 | Schreiber | 606/219 |
| 4,994,073 | 2/1991 | Green | 606/220 |
| 5,454,832 | 10/1995 | Favicchia | 606/212 |

FOREIGN PATENT DOCUMENTS

| | | |
|---|---|---|
| 2603794 | 3/1988 | France . |
| 199989 | 12/1938 | Switzerland . |
| 302249 | 12/1954 | Switzerland . |
| 514092 | 11/1939 | United Kingdom . |

OTHER PUBLICATIONS

International Search Report for Application No. PCT/US96/02511.

English language abstract of document AL1, WPI accession number 88-121555/18, Derwent World Patents Index, Dialog file 351.

*Primary Examiner*—Michael Buiz
*Assistant Examiner*—Patrick W. Rasche
*Attorney, Agent, or Firm*—Michael A. Sanzo; Vinson & Elkins

[57] ABSTRACT

The present invention is directed to devices that can be used for repairing cracks that form in the hoof of an animal. Methods for using these devices in repairing cracks are also claimed.

14 Claims, 2 Drawing Sheets

DEVICE FOR THE REPAIR OF HOOF CRACKS

This application is a continuation of application No. 08/392,424, filed on Feb. 22, 1995, now abandoned.

FIELD OF THE INVENTION

This invention is in the field of animal hoof care as related to devices and methods for repairing cracks.

BACKGROUND OF THE INVENTION

Cracks commonly form in the hooves of animals such as horses for a variety of reasons. Typical causes include injury, overdrying, excessive moisture, poor shoeing and poor genetics. When a crack forms, it can be very painful and render the animal unserviceable for months at a time.

A horse's hoof grows from the coronary band downward. The hoof is approximately 8.9 cm long and grows about 0.64 cm each month. Cracks may either start at the top, i.e. close to the coronary band, and move downward or start at the bottom of the hoof and move in an upward direction. The natural expansion and contraction of the hoof caused by walking, running, or even a slight shift in the horse's weight causes the crack to open and close. The opening and closing action at the coronary band may cause the crack to extend into the sensitive tissue of the laminae causing the horse to become lame.

At present, "clips" are typically used in an attempt to prevent the expansion of hoof cracks. A clip is a portion of the horseshoe that is heated and then thinned out and wrapped around the remainder of the shoe. However, because of their position, such clips are generally ineffective at preventing the expansion of cracks lying near the coronary band.

Veterinarians and farriers have used a wide array of devices and processes in an effort to retard the expansion of cracks near the coronary band. These methods include lacing cracks with horse-shoeing nails of stainless steel; screwing a hose clamp across the crack and then tightening it; or excavating the crack and filling it with dental acrylic or similar material.

There have also been a number of patents with claims directed to devices or methods for effecting crack repair. U.S. Pat. No. 309,690 discloses a clamping device that is formed of two separate clips drawn together using a "wedge-shaped key." U.S. Pat. Nos. 381,868; 652,796; and 1,163,617 all disclose devices which rely upon the elasticity of the clamp itself to compress crack openings. Two of these patents, U.S. Pat. Nos. 381,868 and 1,163,617, disclose clamps that require a setting tool. The third, U.S. Pat. No. 652,796, uses a spring device to effect clamp closure. U.S. Pat. No. 408,080 relies upon a screw mechanism for drawing opposite sides of the disclosed clamping device together and U.S. Pat. No. 3,915,170 discloses a method in which screws are fastened to an animal's hoof and then tied together with a material such as fishing line.

In general, the devices that have been used for repairing the cracks in animals' hooves have required laborious installation and maintenance procedures or have required access to specialized tools. A need exists for an inexpensive device that can be used to close hoof cracks and that does not require specialized tools for installation or maintenance.

SUMMARY OF THE INVENTION

The present invention is directed to a staple-like device useful for repairing a crack in an animal's hoof. The device has a central shank region connecting one or more prong-like structures located at or near each end. The prong-like structures are substantially parallel to one another and are substantially perpendicular to the central shank region of the device.

The surface of the prong-like structure disposed away from the central shank portion (i.e. the "outer surface") is beveled so as to form a knife-edge at the terminal end of the prong-like structure, i.e. at the end furthest from the central shank region. Preferably, the beveled area occupies only a portion of the prong-like structure. Optionally, lateral surfaces of the prong-like structure may also be beveled such that the outer face becomes trapezoidal or, more preferably, beveled so that the prong terminates at a point. It is preferred that beveled lateral surfaces of prong-like structures be symmetrical relative to one another so as to facilitate the entry of these structures into a hoof. The inner surface of the prong-like structures may also be beveled provided that such beveling is consistent with prong-like structures located at opposite ends of the shank being drawn toward one another when the device is inserted into a hoof. A crack repair device may have more than one prong-like structure at either end or a shank region that extends beyond one or more of these structures. A brace member may be connected between the shank region and the prong-like structures in order to provide reinforcement at points of stress.

In a preferred embodiment, each prong-like structure on the staple-like device has at least one barb extending in an outward direction. The outer surface of the barb, i.e. the surface furthest from the prong-like structure is preferably beveled so as to facilitate the drawing of such structures at opposite ends of the shank toward one another upon insertion of the device into an animal's hoof. Each barb has an uppermost, top surface which forms an angle with the outer surface of the prong-like structure of between 0 and 90 degrees. Preferably, the top surface of the barb and the outer surface of the barb come together to form a knife edge which digs into the fibrous tissue of the hoof to help prevent the displacement of the device. Optionally, the lateral surfaces of the barb may be beveled so that they come together with the top and outer surfaces to form a point. Prong-like structures may have more than one barb and a device may have more than one prong-like structure.

The present invention is also directed to methods for using the devices described above for repairing a crack in animal's hoof. This can be accomplished by inserting the device into the hoof so that its shank portion bridges the crack and its prong-like structures exert compressive pressure forcing opposite sides of the crack together. Any of the devices discussed above may be used. Insertion can be simply accomplished by driving the device into a hoof with a hammer. Preferably, a device is inserted at the end of the crack nearest the coronary band.

REFERENCED NUMERALS IN FIGURES

In FIGS. 1–5E, the following referenced numbers are used:

| | |
|---|---|
| 10: crack repair device | 12: shank |
| 14: prong-like structure | 16: bevel |
| 18: barbs | 20: pastern |
| 22: coronary band | 24: hoof wall |
| 26: expansion direction | 28: laminae or sensitive tissue |
| 30: coffin bone | 32: horseshoe |
| 34: clip | 36: crack |
| 38: braces | 40: extension |
| 42: nail clinches | |

DETAILED DESCRIPTION OF THE INVENTION

Figure 1:
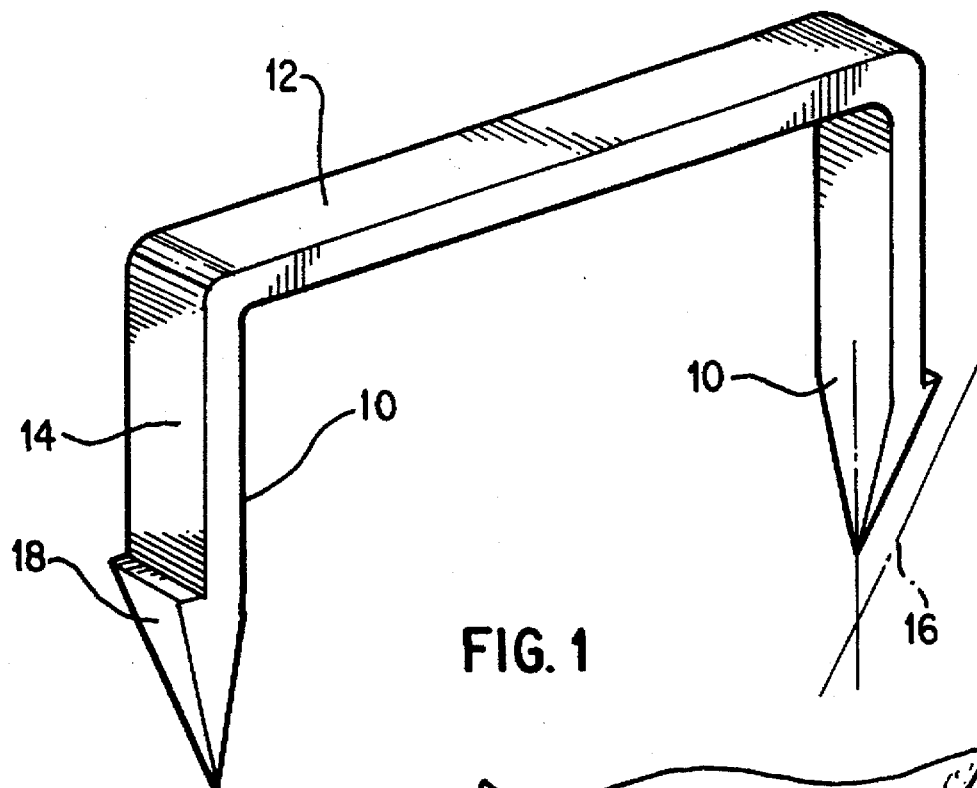
FIG. 1 shows the staple-like device and its features.

The present invention is directed to a staple-like device useful for immobilizing a crack in an animal's hoof. The general features of the device are shown in FIG. 1. The central shank portion (12) of the device has prong-like structures (14) at each end which are driven into the hoof wall. As shown in the figure, the prong-like structures extend from the central shank region in an essentially perpendicular direction and are essentially parallel to one another. Preferably, the prong-like structures and shank region are formed from a single material, however, the shank region and prong-like structures may be formed separately and then fused together. The arrows associated with reference numerals 12 and 14 point to the outer surface of the device. Opposite to the outer surface, there is an inner surface which includes that part of the shank region which lies closest to the hoof after insertion. The device also has two lateral surfaces connecting the outer and inner surfaces.

The terminal end of prong-like structures, i.e. the end lying furthest from the shank region, has an outer surface that is beveled (16) in such a manner as to force prong-like structures inward as the device is driven into a hoof. In order to facilitate the entry of the prong-like structures into the hoof, the beveled outer surface of the structure comes together with the inner surface to form a knife edge. In the particular embodiment shown in FIG. 1, the lateral surfaces of prong-like structures are symmetrically beveled so that the terminal portion of the structure ends in a point. If desired, the inner surface of the prong-like structure may also be beveled provided that the angle formed by the beveling does not prevent the structure from being forced inward in response to being driven into a hoof. The left most prong-like structure in FIG. 1, i.e. the structure closest to reference numeral 18, is illustrated as having a terminal end with a beveled inner surface. The opposite prong-like structure, closest to reference numeral 16, has an inner surface that is not beveled.

Preferably, prong-like structures also contain barbs (18) that secure these structures (10) to the fibrous tissue of the hoof in order to prevent the device from becoming dislodged. The barbs extend in an outward direction from the prong forming an angle of between 0 and 90 degrees with the outer surface of the prong-like structure. Preferably, the outer surface of the barb is beveled so as to facilitate the entry of prong-like structures into a hoof and to help apply inward pressure on the structure. As with the terminal end of prong-like structures, the lateral surfaces of the barb may be beveled so that surfaces come together to form a point.

Figure 2:
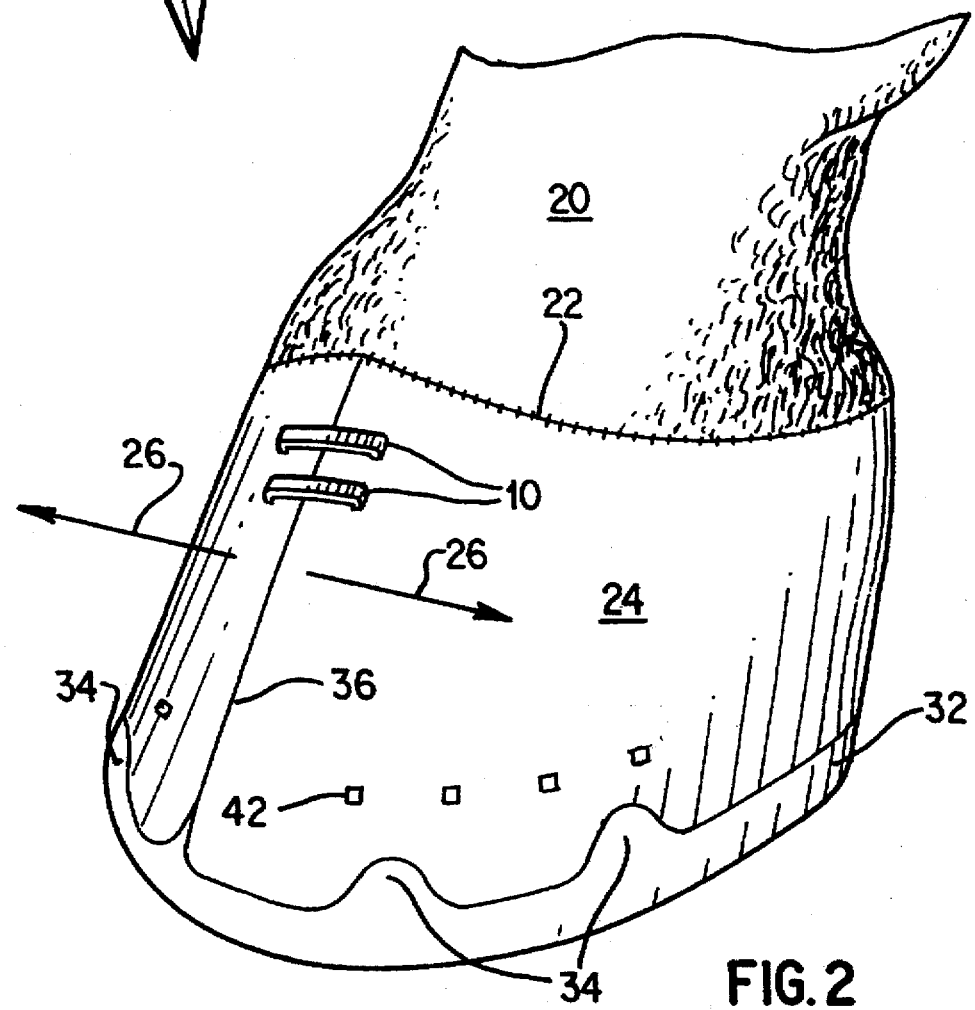
FIG. 2 shows the various anatomical features of a horse's hoof. It also shows the location of shoe, clips and devices.

A typical animal's hoof and leg are illustrated in FIG. 2. The pastern (20) is attached to the hoof at the coronary band (22) and the hoof wall (24) extends downward. The figure shows a crack (36) growing vertically down from the coronary band (22) and a horseshoe (32) with clips (34) which, together, help prevent expansion of crack (36) at the bottom portion of the hoof. Four nail clinches (42) are shown holding the shoe (32) in place. Just under the coronary band (22) are two staple-like devices (10) bridging the crack (36) and immobilizing expansion (26).

Figure 3:
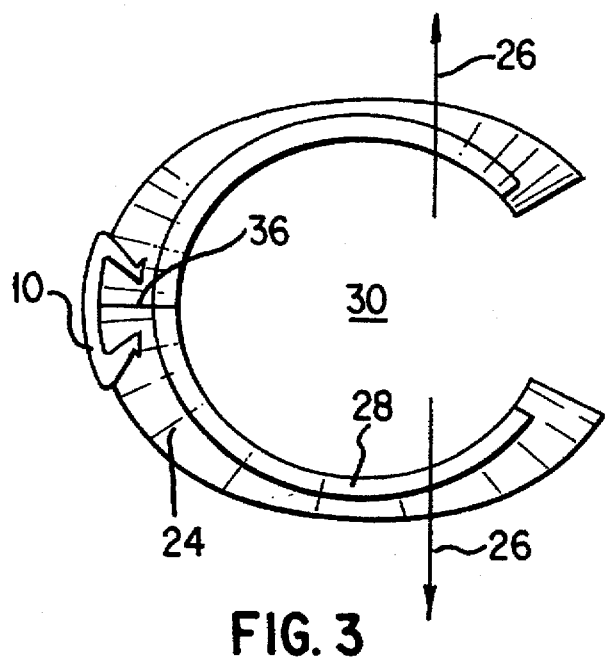
FIG. 3 is a cross section of a horse's hoof showing its anatomical structure and the location of a device.

FIG. 3 is a cross section of an animal's hoof illustrating its inner components. The hoof wall (24) surrounds the entire inner structure and is the first in a line of shock absorbing structures. The hoof absorbs the shock of impact through expansion (26) and must withstand stress as much as ten times the weight of the horse. The laminae (28) is located directly under the hoof wall (24) and is comprised of very sensitive tissue supplying the hoof with blood from a system of very fine capillaries. The coffin bone (30) is the last bone in the leg and is attached to the hoof wall (24) by the very strong laminae (28). A deep crack (36) is shown in the figure as extending from the hoof wall (24) into the laminae (28). The crack has been bridged with a staple-like device (10) which, through inward pressure exerted by beveled prong-like structures, has effected closure.

Figure 4A:
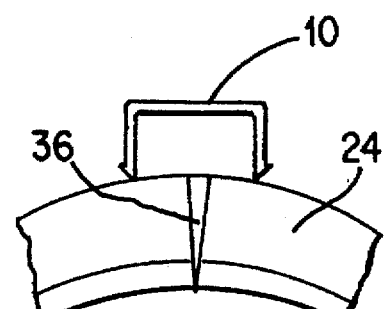
FIGS. 4A and 4B demonstrate the way in which a device is used to immobilize a crack in an animal's hoof.
Figure 4B:
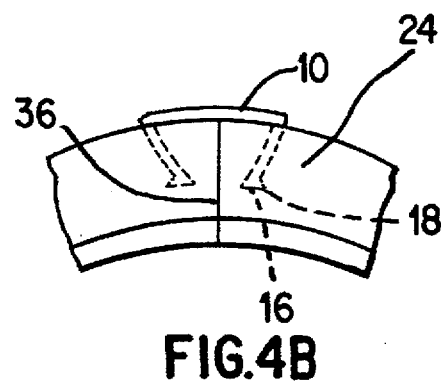

FIGS. 4A and 4B illustrate the physical performance of the device (10). When prong-like structures (14) are driven into the hoof wall (24) the angle of the bevel (16) at their terminal end causes these structures (14) to force the crack (36) together. Barbs (18) on the prong-like structures (14) dig into the fibrous tissue of the hoof wall (24) thereby locking the device in place for the continued maintenance of compressive pressure. Typically, the staple-like device (10) will be driven into the hoof with a hammer. Prong-like structures (14) should be long enough to securely fasten the device but should not extend into the laminae (28) as this may cause the horse to become lame and might possibly result in infection.

Figures 5A, 5B, 5C:
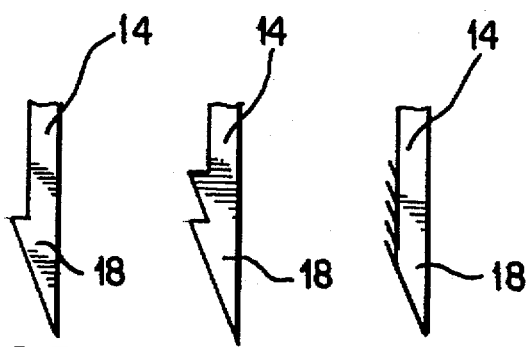
FIGS. 5 (A–C), 5D and 5E show variations of crack repair devices.
Figure 5D:
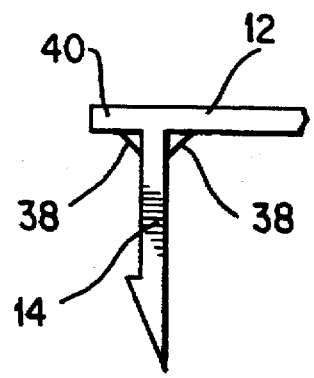
Figure 5E:
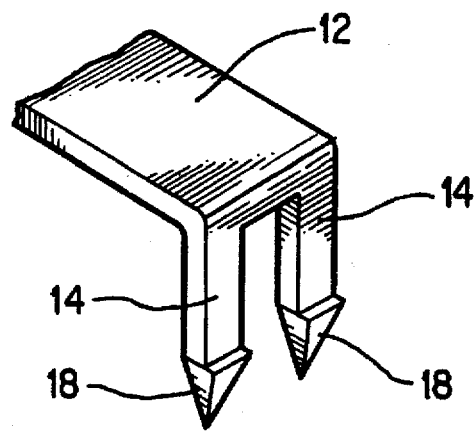

FIGS. 5 (A–C), 5D and 5E show variations of the device (10). FIG. 5A illustrates a single barb (18) at the end of a prong-like structure (14). Alternatively, a single prong-like struture may have multiple barbs (FIG. 5B) or contain barbs in a hair configuration (FIG. 5C). As shown in FIG. 5D, the shank region may extend beyond one or more prong-like structures. In order to provide additional support for prong-like structures, brace members may be used to connect the shank region and the prong-like structures. FIG. 5D shows two corner braces (38) providing reinforcement at points of stress. FIG. 5E illustrates a device with a wide shank region (12) having two prong-like structures (14) at one end, each with a single barb (18). The wider shank region provides a larger area for crack abridgment and a larger surface for hammering. The additional prong-like structures increase the compressive pressure applied to cracks. Any of the variations described above may be used in combination with any others in forming devices.

The crack repair devices disclosed herein can be made of any metal, metal alloy or similar substance and can be produced using standard procedures well known to those skilled in the art of manufacturing such devices. Unlike previously described devices for repairing hoof cracks, those disclosed herein have no moving parts and are basically maintenance free. They can be applied by any veterinarian or farrier using only a hammer. Devices should be inexpensive and, unlike horseshoes, do not need to be replaced every six weeks.

The figures and above description illustrate the presently preferred embodiments of this invention but should not be construed as limiting its scope. As would be readily apparent to one of skill in the art, devices equivalent to those illustrated may be produced which have other shapes; which have prong-like structures placed in different arrangements;

or which have prong-like structures of a different shape. The barbs located on the devices can assume any shape consistent with their purpose of locking devices into place and the beveled portions of the prong-like structures may have any angle consistent with their function of directing these structures inward in response to the insertion of the device into an animal's hoof.

All references cited above are fully incorporated by reference. Having now fully described the invention, it will be understood by those of skill in the art that the invention may be performed within a wide and equivalent range of conditions, parameters and the like, without affecting the spirit or scope of the invention or any embodiment thereof. The scope of the invention should be determined by the appended claims and their legal equivalents, rather than by the specific illustrations and examples given above.

What is claimed is:

1. A method for repairing a crack in an animal hoof comprising: inserting at least one staple into said hoof in such a manner that said staple bridges said crack and exerts pressure forcing opposite sides of said crack together and wherein:
   (a) said staple can be applied using only a hammer and comprises:
      (i) a central shank region of sufficient width to provide a surface for hammering and of sufficient strength to withstand hammering into the hoof of an animal without breaking;
      (ii) at least one prong located at each opposite ends of said central shank region, wherein:
         (a) said prongs at opposite end of said central shank region and unitary with said central shank region are substantially parallel to one another;
         (b) said prongs at opposite ends of said central shank region are substantially perpendicular to said central shank region; and
         (c) the outer surface of at least a terminal portion of each prong is beveled sufficiently so that prongs at opposite ends of said central shank region are drawn toward one another when said staple is hammered into said hoof;
   (b) said staple is inserted into said hoof by hammering; and
   (c) said pressure is a result of beveled prongs mechanically pushing on opposite sides of said crack when said staple is hammered into said hoof.

2. The method of claim 1, wherein said staple is positioned at the end of said crack nearest a coronary band.

3. The method of claim 1, wherein said central shank region of said staple has a rectangular shape to provide a surface for hammering.

4. The method of claim 1, wherein at least one prong of said staple has a barb beveled so as to prevent said staple from being dislodged after having been hammered into said hoof.

5. The method of claim 1, wherein said staple has more than two prongs.

6. The method of claim 1, wherein said central shank region extends beyond at least one prong.

7. The method of claim 1, further comprising at least one brace member connecting the central shank region of said staple to at least one prong.

8. A method for repairing a crack in an animal hoof comprising: inserting at least one staple into said hoof in such a manner that said staple bridges said crack and exerts pressure forcing opposite sides of said crack together and wherein:
   a) said staple can be applied using only a hammer and comprises:
      i) a central shank region of sufficient width to provide a surface for hammering and of sufficient strength to withstand hammering into the hoof of an animal without breaking;
      ii) at least one prong located near each opposite end of said central shank region, wherein:
         (a) and unitary with said central shank region said prongs at opposite ends of said central shank region are substantially parallel to one another;
         b) said prongs near opposite ends of said central shank region are substantially perpendicular to said central shank region; and
         (c) the outer surface of at least a terminal portion of each prong is beveled sufficiently so that prongs near opposite ends of said central shank region are drawn toward one another when said staple is hammered into said hoof;
   b) said staple is inserted into said hoof by hammering; and
   c) said pressure is a result of beveled prongs mechanically pushing on opposite sides of said crack when said staple is hammered into said hoof.

9. The method of claim 8, wherein said staple is positioned at the end of said crack nearest a coronary band.

10. The method of claim 8, wherein said central shank region of said staple has a rectangular shape to provide a surface for hammering.

11. The method of claim 8, wherein at least one prong of said staple has a barb beveled so as to prevent said staple from being dislodged after having been hammered into said hoof.

12. The method of claim 8, wherein said staple has more than two prongs.

13. The method of claim 8, wherein said central shank region extends beyond at least one prong.

14. The method of claim 8, further comprising at least one brace member connecting the central shank region of said staple to at least one prong.

* * * * *